(12) United States Patent
Tsuyuki

(10) Patent No.: US 7,675,685 B2
(45) Date of Patent: Mar. 9, 2010

(54) IMAGE DISPLAY APPARATUS

(75) Inventor: Motomi Tsuyuki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 285 days.

(21) Appl. No.: 11/844,245

(22) Filed: Aug. 23, 2007

(65) Prior Publication Data

US 2008/0055899 A1    Mar. 6, 2008

(30) Foreign Application Priority Data

Sep. 5, 2006  (JP) ............... 2006-240063

(51) Int. Cl.
  *G02B 27/14*   (2006.01)
  *G09G 5/00*    (2006.01)
(52) U.S. Cl. .......................... 359/631; 345/8
(58) Field of Classification Search ......... 359/629–634; 345/7–9; 362/327, 328, 545
See application file for complete search history.

(56) References Cited

U.S. PATENT DOCUMENTS

| | | | |
|---|---|---|---|
| 6,023,373 A | 2/2000 | Inoguchi et al. | |
| 6,333,820 B1 | 12/2001 | Hayakawa et al. | |
| 7,081,999 B2 | 7/2006 | Yamazaki | |
| 7,549,775 B2 * | 6/2009 | Inoguchi ...................... | 362/328 |

FOREIGN PATENT DOCUMENTS

| | | |
|---|---|---|
| JP | 11-125791 A | 5/1999 |
| JP | 11-337863 A | 12/1999 |
| JP | 2000-010041 A | 1/2000 |
| JP | 2001-166252 A | 6/2001 |
| JP | 2002-244076 A | 8/2002 |

* cited by examiner

*Primary Examiner*—Alicia M Harrington
(74) *Attorney, Agent, or Firm*—Canon U.S.A., Inc. I.P. Division

(57) ABSTRACT

An image display apparatus including an image display unit, a light source unit, an illumination optical system configured to guide light from the light source unit to the image display unit, and a display optical system configured to guide light from the image display unit to a viewer is disclosed. With such an image display apparatus, luminance non-uniformity viewed at an exit pupil can be suppressed by intentional provision of uneven luminance distribution to an optical surface that receives light from the light emitting device of the light source unit.

4 Claims, 13 Drawing Sheets

IMAGE DISPLAY APPARATUS

BACKGROUND OF THE INVENTION

1. Field of the Invention

The present invention relates to an image display apparatus. The image display apparatus according to the present invention is suitable for, for example, a head-mounted display (HMD) and eyeglass displays.

2. Description of the Related Art

Various image viewing apparatuses (image display apparatuses) that are worn on the head and allow image information displayed on an image display device (e.g., liquid-crystal display device) to be viewed as an enlarged virtual image, so-called head-mounted displays (HMDs), have been proposed.

Head-mounted image display apparatuses need to allow a viewer to view a realistic image with a wide angle of view and have a compact lightweight structure.

Among such apparatuses, a HMD that uses a reflective liquid-crystal display device is known (see, for example, Japanese Patent Laid-Open No. 2001-166252, No. 11-125791 (corresponding to U.S. Pat. No. 6,333,820), No. 11-337863 (corresponding to U.S. Pat. No. 6,023,373), No. 2000-010041, and No. 2002-244076 (corresponding to U.S. Pat. No. 7,081,999).

With recent advances in high-definition liquid-crystal display devices, liquid-crystal display devices that have as many pixels as, or even more than, existing displays while at the same time being more miniaturized than existing displays are being developed.

In order to enable a realistic image with a wider angle of view to be displayed using a miniaturized liquid-crystal display device, it is necessary to increase the magnification of a display optical system. However, an increase in magnification leads to an increase in size of the optical system, and inevitably, this tends to an increase in the size of the entire structure of the apparatus.

To miniaturize the optical system while attaining a wide angle of view and enabling display of a high-definition image, an effective way is to use a decentered optical system including an optical element that has a rotationally asymmetric surface.

However, the use of a decentered optical system is prone to cause luminance non-uniformity in an image viewed at an exit pupil of the display optical system.

Additionally, the ratio of light incident on the exit pupil at a viewer side to light that has been optically modulated by a liquid-crystal display device after having emerged from an illumination unit is reduced, and the efficiency of illumination tends to be decreased.

Therefore, in order to miniaturize the entire optical system and also enable a high-definition image with a wide angle of view to be obtained, an important factor is to appropriately set the structure of an illumination optical system for illuminating a liquid-crystal display device and the structure of a display optical system that guides light from the liquid-crystal display device to an exit pupil at a viewer side.

SUMMARY OF THE INVENTION

An image display apparatus according to an aspect of the present invention includes an image display unit, a light source unit, an illumination optical system configured to guide light from the light source unit to the image display unit, and a display optical system configured to guide light from the image display unit to a viewer. In this image display apparatus, the optical surface that receives light from the light emitting device of the light source unit has intentional uneven luminance distribution and/or diffusion directivity varying in accordance with a position on the optical surface.

Further features and aspects of the present invention will become apparent from the following description of exemplary embodiments (with reference to the attached drawings).

DESCRIPTION OF THE EMBODIMENTS

Various embodiments, features and aspects of an image display apparatus according to the present invention will herein be described below with reference to the drawings.

First Exemplary Embodiment

Figure 1:
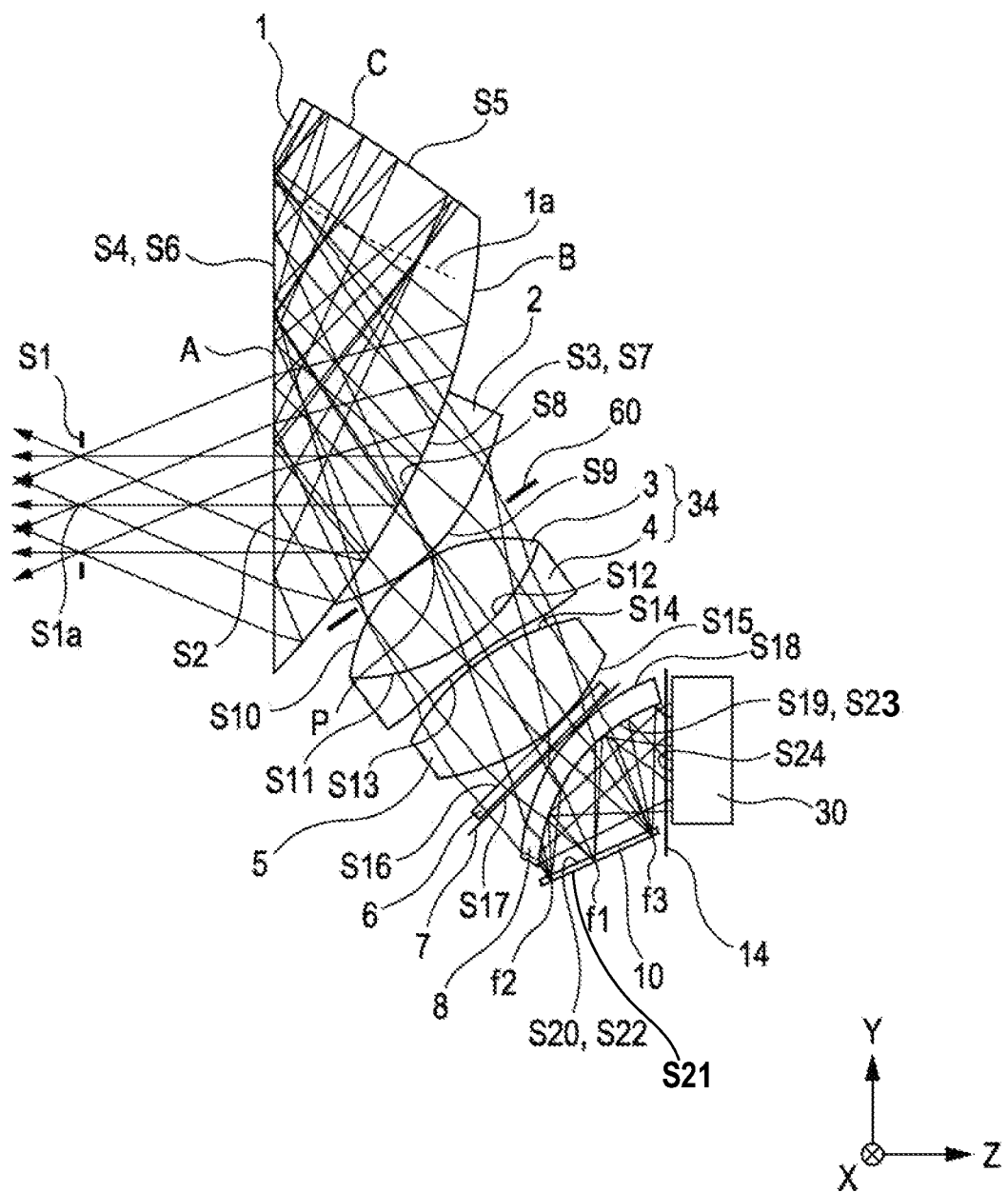
FIG. 1 is an illustration of an example optical system in an image display apparatus according to a first embodiment of the present invention.

FIG. 1 is a schematic diagram that illustrates a main portion of a head-mounted display being an image display apparatus according to a first embodiment of the present invention. Optical data for the first embodiment will be shown in a first numerical example below.

Referring to FIG. 1, an optical element 1 is a prism that includes a transparent medium with three optical surfaces. The transparent medium has a material refractive index of greater than one. The optical element 1 has surfaces (optical surfaces) A, B, and C. The surface A includes of surfaces S2, S4, and S6 on an optical path. That is, the surfaces S2, S4, and S6 are flush with each other. The surface B includes surfaces S3 and S7 on an optical path. That is, the surfaces S3 and S7 are flush with each other. The surface C is a surface S5 on an optical path. The optical element 1 having the three surfaces A, B, and C according to the present embodiment may have more than three optical surfaces.

It is noted that each of the surfaces A, B, and C is a refractive and/or reflective surface having a curvature. The surface B is a half-mirror surface.

An optical element 2 is a prism having a transparent medium with two optical surfaces (surfaces S8 and S9). The transparent medium has a material refractive index of greater than one. Each of the surfaces S8 and S9 is a refractive surface having a curvature. The optical elements (prisms) 1 and 2 are joined together at the surfaces S7 and S8.

A lens element (optical element) 3 has surfaces S10 and S11. A lens element (optical element) 4 has surfaces S12 and S13. The surfaces S11 and S12 are attached together, and the lens elements 3 and 4 form a cemented lens 34.

A lens element (optical element) 5 has surfaces S14 and S15. A planar element 6 has two planes (surfaces S16 and S17).

The planar element 6 is bonded to a polarizer 7. A cylindrical lens element 8 has a surface S18 and a surface S19 (flush with a surface S23, which will be described below). Each of the surfaces S18 and S19 is of a decentered rotationally asymmetrical shape. The surface S19 is a transmissive/reflective surface (half-mirror surface).

A reflective LCD (liquid-crystal display device) 10 is used as an image display unit configured to display an image. Surfaces S20, S22 and S21 are surfaces that constitutes a cover glass. The surface S21 corresponds to a display surface of the LCD 10.

A light source unit 30 emits light from a light emitting device disposed in the light source unit 30. Light emerging from an optical surface S24 being a diffusing surface of the light source unit 30 passes through a polarizer 14, is reflected by the surface S23, and is then incident on the LCD 10. The surface S23 is flush with the surface S19 of the cylindrical lens element 8. That is, the surface S19 of the cylindrical lens element 8 (surface S23) functions as a part of an illumination optical system.

An exit pupil S1 disposed at a viewer side is positioned corresponding to an eye of the viewer. Each of all surfaces of the optical elements other than the cemented lens 34 and the cylindrical lens element 8, i.e., of the optical elements 1 and 2 and the lens element 5 is symmetrical with respect to only the surface of the drawing (y-z plane) (rotationally asymmetric surface).

Light emerging from the optical surface S24 of the light source unit 30 is linearly polarized when passing through the polarizer 14 and is then reflected by the surface S23 of the cylindrical lens element 8, and the reflected light is directed to the LCD 10. The light is obliquely incident on the surface S20 of the reflective LCD 10 and then obliquely reflected from the surface S21. The reflected light passes through the surface S22 (flush with the surface S20), enters the cylindrical lens element 8 from the surface S19, and then exits from the surface S18. The light passes through the polarizer 7, enters the planar element 6 from the surface S17, and exits from the surface S16 toward the lens element 5.

At this time, because the polarization direction of the light linearly polarized by the polarizer 14 is rotated in the liquid crystal, the polarizer 7 is set in a direction that allows the light with the rotated polarization direction to pass therethrough.

When the direction of linear polarization of the polarizer 7 is displaced approximately 90° from the direction of linear polarization of the polarizer 14 (the rotation of the polarization direction in the liquid crystal is approximately 90°), light that passes through the surface S19, without being reflected therefrom, after having been linearly polarized by the polarizer 14 (ghost light) is present. However, the ghost light is blocked by the polarizer 7, so the ghost light does not reach the exit pupil (eye) S1.

Light entering the lens element 5 from the surface S15 exits from the surface S14 and then enters the lens element 4 from the surface S13. The light entering the lens element 4 passes through the joined surface S12 (of the lens element 4) and surface S11 (of the lens element 3) and exits from the surface S10 toward the optical element 2.

A stop 60 is disposed between optical element 2 and optical element 3 at the pupil image plane (which will be described later in the specification).

Light entering the optical element 2 from the surface S9 passes through the joined surface S8 (of the optical element 2) and surface S7 (of the optical element 1) and is then incident on the optical element 1. Light incident on the surface B (surface S7) of the optical element 1 is reflected by the surface A (surface S6) and is then guided to the surface C (surface S5). The light incident on the surface C (surface S5) undergoes a fold reflection, which will be described below, in a direction substantially opposite to the incidence direction and travels in the direction opposite to the light before being reflected by the surface C. The light reflected from the surface C (surface S5) is reflected by the surface A (surface S4) again, reflected by the surface B (surface S3) again, and exits from the surface A (surface S2) toward the exit pupil S1.

At this time, an intermediate image plane of a displayed image is formed at a position 1a in the optical element 1.

In this exemplary structure, an intermediate image is formed between reflection from the surface S6 and reflection from the surface S5. However, it is not necessarily required to form the intermediate image therebetween.

Surfaces interacting with between reflection of a pencil of rays at the surface S5 downstream of the intermediate image plane 1a and exiting of the pencil of rays from the surface S2 (surfaces S5, S4, S3, and S2) correspond to an eyepiece optical system. The optical system (elements 2 to 8) disposed between other portions of the optical element 1 (surfaces S7 and S7) and the cover glass (surfaces S20 and S21) of the LCD 10 corresponds to a relay optical system.

The relay optical system (surfaces S7 and S6 and elements 2 to 8) and the eyepiece optical system constitute a display optical system.

The surface S3, functioning as the final reflective surface, is concave with respect to the surface S2, functioning as an emergent surface, (with respect to the image display device side) and forms a concave mirror having a strong power. Because it is difficult for the eyepiece optical system to fully correct aberration alone, an intermediate image is formed such that the intermediate image plane 1a is formed in such a way that aberration in the eyepiece optical system is cancelled by the relay optical system. More specifically, an intermediate image is formed on the intermediate image plane so as to be curved, have an astigmatic difference, or the like, depending on conditions occurring in the eyepiece optical system, such as curvature of field or astigmatism. This improves image quality of a finally viewed image.

Reflection at the surface S4 can be internal total reflection in the optical element 1. In this case, the loss of the amount of light is reduced. A pencil of rays to be reflected can be totally reflected in at least an area shared by both a pencil of rays exiting from the surface S2 and a pencil of rays reflected from the surface S4. This can achieve a higher degree of flexibility in design while obtaining substantially the same brightness, compared with a case in which all rays to be reflected are totally reflected. In this case, refection that does not depend on internal total reflection at the surface S4 is caused by a reflective film (e.g., aluminum or silver film). Reflection at the surface S5 is caused by a reflective film.

In the optical element 1, light passes through, in sequence, the surface B (S7), the surface A (S6), the surface C (S5), the surface A (S4), the surface B (S3), and the surface A (S2). A path is divided at the surface C into a forward pathway of the surface B (S7) to the surface A (S6) to the surface C (S5) and a backward pathway of the surface C (S5) to the surface A (S4) to the final reflective surface B (S3). The backward pathway follows the forward pathway in reverse.

A surface that has the function of switching from a forward pathway to a backward pathway (fold reflection), like the surface C, is referred to as a "fold surface," which previously described.

In this way, the optical path is folded back at the plurality of decentered reflective surfaces A, B, and C, and the forward pathway and the backward pathway substantially overlap each other. Therefore, a long optical path length is accommodated in the small optical element 1. This can miniaturize the entire display optical system.

When the fold surface C reflects incident light, an angle between light incident on the fold surface C and light exiting therefrom is represented by θ. The angle θ can satisfy the following condition:

$$|\theta| < 60° \quad (1)$$

If this condition is not satisfied, an optical path downstream of fold reflection (backward pathway) does not exactly follow the forward pathway in reverse but is rather a zigzag pathway. This results in an increased size of the optical element 1. The angle θ can satisfy the following condition:

$$|\theta| < 30° \quad (2)$$

If the conditional expression (2) is not satisfied, light can return, but the forward pathway and the backward pathway cannot overlap each other. This results in an increased size of the optical element 1, and therefore, it is difficult to miniaturize the entire display optical system or the entire image pickup optical system. The angle θ can satisfy the following condition:

$$|\theta| < 20° \quad (3)$$

If the conditional expression (3) is satisfied, further miniaturization is easy.

According to a definition in an existing system that does not support a decentered system, a coordinate system is represented relative to the vertices of optical surfaces, the z-axis is an optical axis, the y-z plane is a meridional plane, and the x-z plane is a sagittal plane.

In contrast, since the first embodiment uses a decentered system, a local meridional plane and a local sagittal plane that support the decentered system are newly defined below.

The local meridional plane is defined as a plane that contains incident light and emergent light of a center ray corresponding to an angle of view at a hit point (incident position) of the center ray corresponding to an angle of view on each of the surfaces. The local sagittal plane is defined as a plane that contains the hit point, is perpendicular to the local meridional plane, and is parallel to a sagittal plane in a coordinate system of the vertices of optical surfaces (normal sagittal plane). The curvature in the vicinity of the hit point of the center ray corresponding to an angle of view on each of the surfaces is calculated, and the radius of curvature on the local meridional plane with respect to the center ray corresponding to an angle of view is defined as "ry," and the radius of curvature in the local sagittal plane is defined as "rx."

How to read optical data in the numerical examples will now be described. The leftmost item "SURF" denotes a surface number in the order in which light passes through the surface, counting from the LCD 10.

"X," "Y," and "Z" denote the positions (x,y,z) of the vertices of each surface in a coordinate system defined by the y-axis and the z-axis illustrated in the drawing and the x-axis being directed toward the far side of the drawing where the center of the first surface S1 is the origin point (0,0,0). "A" denotes the rotation angle a (unit: degree) about the x-axis where the counterclockwise direction in the drawing is the positive direction. The item "typ" represents the type of a surface shape. In the item "typ," SPH denotes a spherical surface, FFS denotes a rotationally asymmetric surface, and CYL denotes a cylindrical surface that has a refractive power only in the meridional plane.

The rotationally asymmetric surface FFS according to the numerical examples is defined by the following equation:

$$z = (1/R)*(x^2+y^2)/(1+(1-(1+k)*(1/R)^2*(x^2+y^2))^{(1/2)}) + \\ c2+c4*y+c5*(x^2-y^2)+c6*(-1+2*x^2+2*y^2)+c10* \\ (-2*y+3*x^2*y+3*y^3)+c11*(3*x^2*y-y^3)+c12* \\ (x^4-6*x^2*y^2+y^4)+c13*(-3*x^2+4*x^4+3*y^2 - \\ 4*y^4)+c14*(1-6*x^2+6*x^4-6*y^2+12*x^2*y^2 + \\ 6*y^4)+c20*(3*y-12*x^2*y+10*x^4*y-12*y^3 + \\ 20*x^2*y^3+10*y^5)+c21*(-12*x^2*y+15*x^4*y + \\ 4*y^3+10*x^2*y^3-5*y^5)+c22*(5*x^4*y-10*x^2*y^3 + \\ y^5)+c23*(x^6-15*x^4*y^2+15*x^2*y^4-y^6)+c24*(- \\ 5*x^4+6*x^6+30*x^2*y^2-30*x^4*y^2-5*y^4-30*x^2*y^4 + \\ 6*y^6)+c25*(6*x^2-20*x^4+15*x^6-6*y^2+15*x^4*y^2 + \\ 20*y^4-15*x^2*y^4-15*y^6)+c26*(-1+12*x^2 - \\ 30*x^4+20*x^6+12*y^2-60*x^2*y^2+60*x^4*y^2 - \\ 30*y^4+60*x^2*y^4+20*y^6)+ \ldots$$

The item "R" denotes the radius of curvature. For the cylindrical surface, the radius of curvature in the meridional plane, ry, is entered.

In the column of "typ", a numerical value attached to FFS indicates that the surface has a rotationally asymmetric shape corresponding to aspherical coefficients k and c described below each Table. The value of c that is not described is zero.

Nd and vd represent a refractive index and an Abbe number of the medium downstream of the surface for a d-line wavelength, respectively. A change in the sign of the refractive index N indicates that light is reflected at the surface.

When the medium is an air layer, only the refractive index Nd is expressed as 1.0000, and the Abbe number vd is omitted.

In the first embodiment, a ray that passes through the z-axis in the exit pupil surface S1 from the center of the exit pupil S1 is defined as a center ray corresponding to an angle of view.

In the display optical system illustrated in FIG. 1, among most peripheral images on the local meridional plane on the display surface (LCD 10), a ray that passes through the height f3 of a most peripheral image at a side remote from the exit pupil S1 and the center of the exit pupil S1a is defined as an f3 central ray, and a ray that passes through the height f2 of a most peripheral image at a side adjacent to the exit pupil S1 and the exit-pupil center S1a is defined as an f2 central ray.

A ray that passes through the middle of height of an image, f1, and the exit-pupil center S1a from the exit pupil S1 is defined as an f1 central ray. At this time, a plane that is parallel to the x-y plane of the optical surface of the cemented lens 34 and that passes through a point, P, of intersection of the f3 central ray and the f2 central ray is defined as a pupil image plane.

With respect to the decentered optical system according to the present embodiment, the diameter of the exit pupil at the position of a pupil of a viewer and a pencil of rays entering the diameter of the exit pupil are subjected to reverse ray tracing from the exit pupil S1 at the viewer side to the optical surface of the light source unit 30 (the optical surface S24 of, for example, a diffuser that receives light from the light emitting device).

This reveals that the angle of incidence of a pencil of rays and the F-number vary in accordance with a position on the LCD 10 due to effects from decentering of the optical system and rotationally asymmetric surface.

In addition, reverse ray tracing from the LCD 10 to the optical surface S24 of the light source unit 30 is performed. This reveals that a pencil of rays on the optical surface S24 does not substantially form a pupil image and variations occur in the density of the pencil of rays on the optical surface S24 and the angle of the pencil of rays due to effects of the decentering of the display optical system and the rotationally asymmetric surface and the optical elements eccentrically positioned.

Therefore, if the optical surface S24 is formed such that uniform luminance is obtained by diffusion of light from the light emitting device in the light source unit 30, depending on the illumination optical system, luminance non-uniformity may occur on the LCD 10 at the time when the light is guided to the LCD 10. In this case, if the luminance non-uniformity occurring on the LCD 10 is guided to the pupil S1 of a viewer by the display optical system, the viewer perceives luminance non-uniformity in a displayed image. Because diffusion directivity characteristics of a pencil of rays exiting from the optical surface S24 in such an illumination optical system are uniform independently of a position, light exits from the optical surface also in a direction in which light will not reach the exit pupil S1. Therefore, unnecessary illumination rays are present.

In contrast to this, according to the present embodiment, luminance distribution is varied in accordance with the number of rays incident on the optical surface S24 of the light source unit 30 per unit area in a pencil of rays subjected to reverse ray tracing performed at predetermined angular intervals from the exit pupil S1 to the optical surface S24 of the light source unit 30. This enables a viewer to view an image whose luminance non-uniformity is significantly reduced when viewing a pencil of rays reaching the exit pupil S1.

In addition, diffusion directivity characteristics of the optical surface S24 are varied in accordance with distribution of angles of incidence of rays on positions on the optical surface S24 of the light source unit 30 in a pencil of rays subjected to reverse ray tracing performed at predetermined angular intervals from the exit pupil S1 to the optical surface S24 of the light source unit 30. This reduces exiting of light toward a direction in which light will not reach the exit pupil S1 and thus improves efficiency of illumination rays.

The display optical system includes at least one optical element eccentrically arranged with respect to a ray reaching the exit-pupil center S1a of the exit pupil S1 from the center of the LCD 10 and at least one rotationally asymmetric surface. Therefore, the entire structure of the image display apparatus can be miniaturized, while at the same time a comfortable image with reduced luminance non-uniformity can be viewed.

The unit of numerical values having dimensions in the first numerical example, which will be described below, is in millimeters. According to the first embodiment, the display optical system can display an image having a size of approximately 18 mm×14 mm with a horizontal angle of view of 60° at infinity in the z-axis.

To enable any viewer to view an image with a horizontal angle of view of 60°, the diameter of a pupil is 14 mm.

Figure 2:
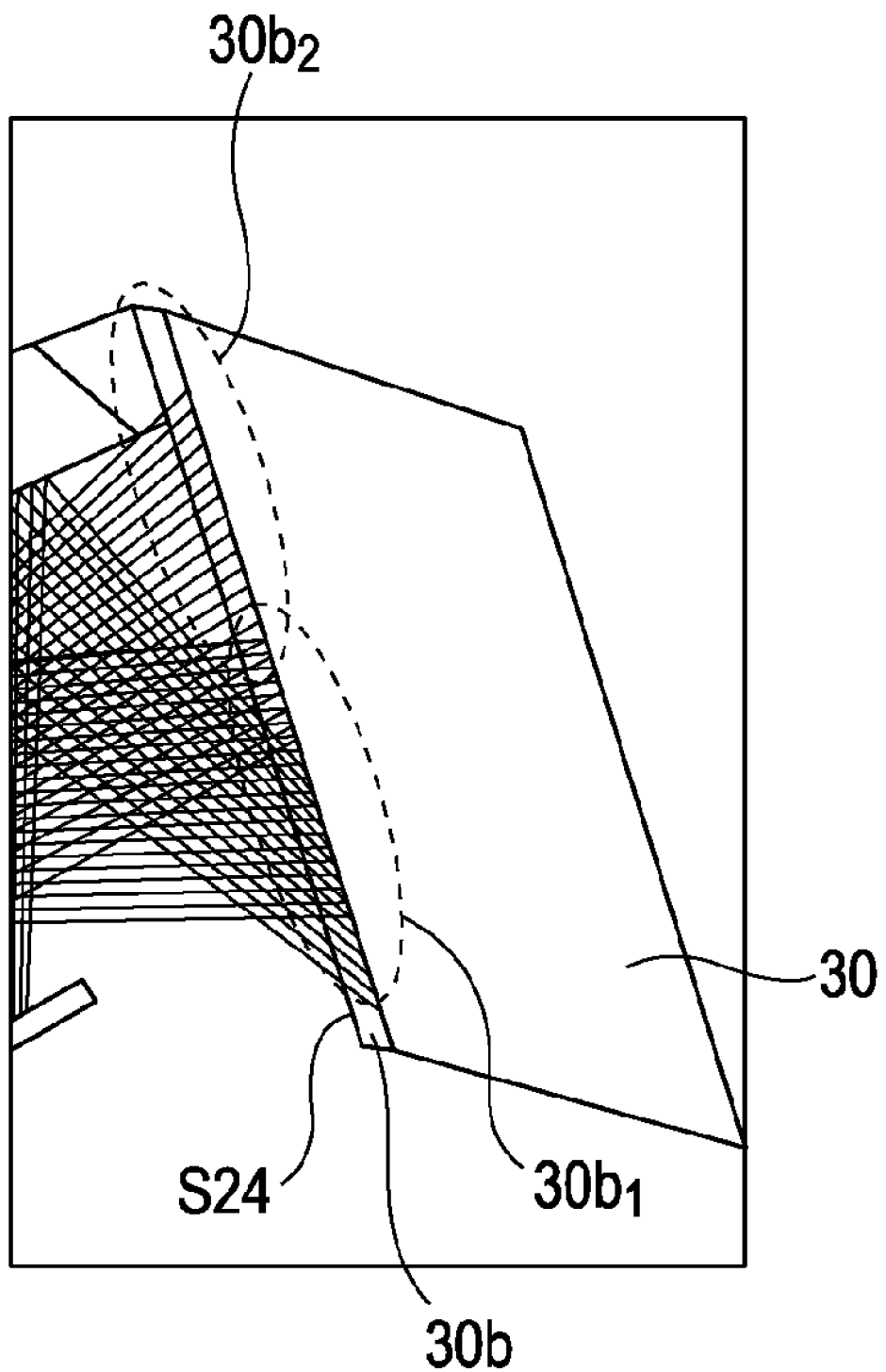
FIG. 2 illustrates a portion of the optical system shown in FIG. 1.

Reverse ray tracing at equal angular intervals is performed on a pencil of rays determined by a pupil diameter of 14 mm and an angle (the horizontal angle of view is 60° and the vertical angle of view is 47°) of rays incident on the exit pupil S1 (in the present embodiment, the center ray corresponding to an angle of view, the f2 central ray, and the f3 central ray). In this case, light is incident on the optical surface S24 of the light source unit 30 as illustrated in FIG. 2. The same concept of the reverse ray tracing applies to all other the embodiments.

Now referring to FIG. 2, when light exiting from the light emitting device diffuses on a diffuser 30b and exits from the optical surface S24, only a ray in a direction illustrated in FIG. 2 is guided to the exit pupil S1. A large number of rays are present in an area 30b1, i.e., the density of a pencil of rays is high. The density of a pencil of rays in an area 30b2 is lower than that in the area 30b1.

If it is assumed that a light source unit is used that produces uniform luminance distribution on the optical surface S24 when light from the light emitting device diffuses and exits from the optical surface S24, a viewer views a dark image when a pencil of rays that is dense in the area 30b1 is guided to the exit pupil S1 by the display optical system. When a pencil of rays that is thin in the area 30b2 is guided to the exit pupil S1, the viewer views a bright image. Therefore, the viewer views an uncomfortable image exhibiting luminance non-uniformity as a whole.

Figure 3A:
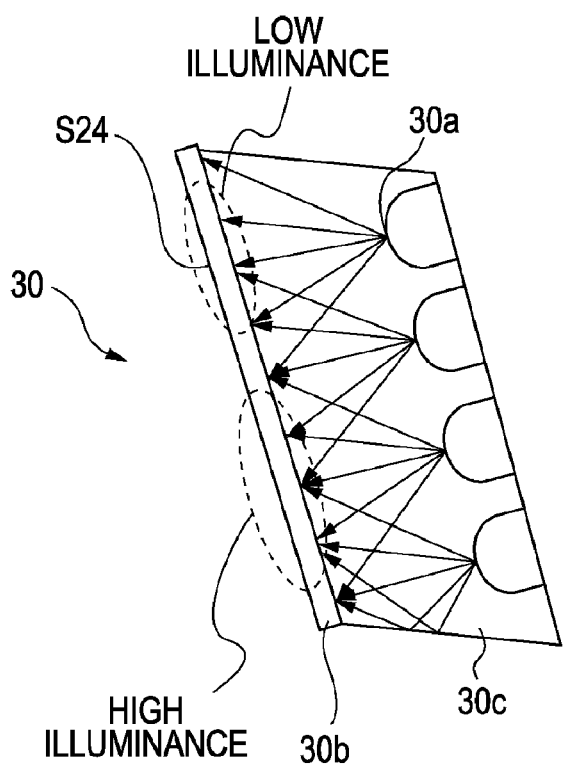
FIGS. 3A and 3B illustrate a portion of the optical system shown in FIG. 1 according to variations.
Figure 3B:
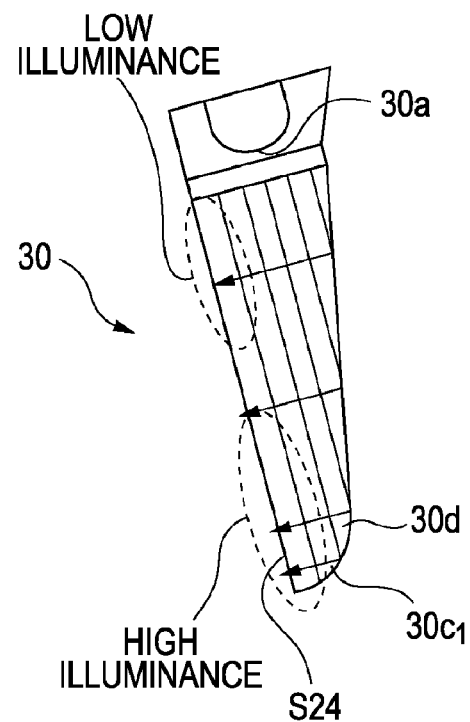
Figure 4A:
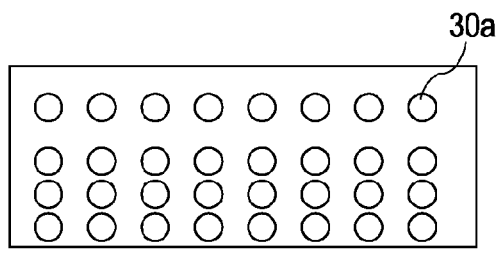
FIGS. 4A to 4D illustrate a portion of the optical system shown in FIG. 1 according to other variations.
Figure 4B:
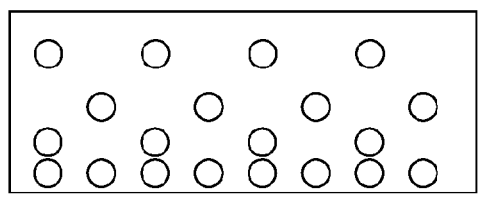
Figure 4C:
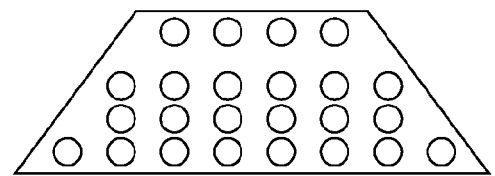
Figure 4D:
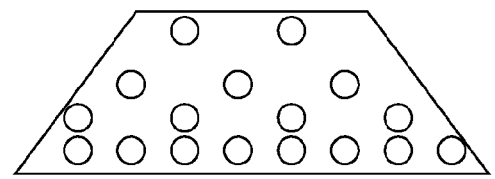

To enable the viewer to view a comfortable image with reduced luminance non-uniformity, according to the first embodiment, luminance distribution on the optical surface S24 of the light source unit 30 is varied. For example, the light source unit 30 can be formed as illustrated in FIGS. 3A and 3B. FIGS. 3A and 3B are illustrated, looking from the side of the light source unit 30.

Figure 14:
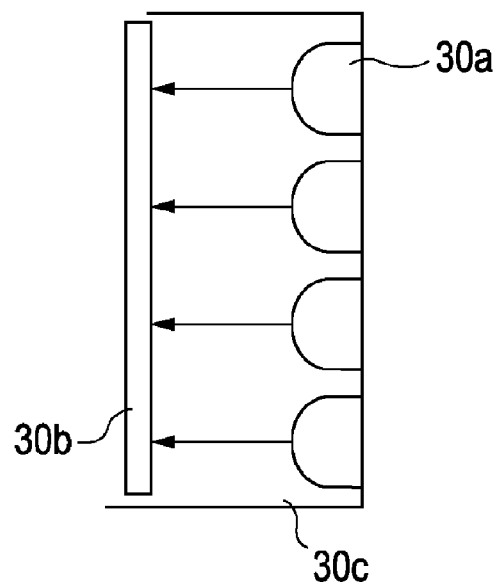
FIG. 14 is an illustration used for comparison with an illumination unit according to an embodiment of the present invention.

As illustrated in FIG. 3A, the light source unit 30 is formed such that light emitting devices 30a and a frame 30c of the light source unit 30 surrounding the optical surface S24 functioning as the diffuser 30b are inclined, unlike those illustrated in FIG. 14. More specifically, the light emitting device 30a is arranged so as not to be diametrically opposite to the optical surface S24. This enables the luminance distribution on the optical surface S24 to have a desired state.

Figure 15:
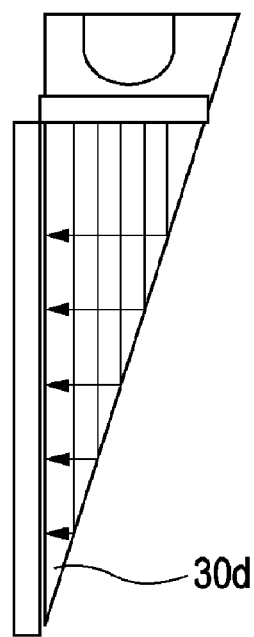
FIG. 15 is an illustration used for comparison with the illumination unit according to an embodiment of the present invention.

Alternatively, as illustrated in FIG. 3B, the light source unit 30 is formed such that a frame 30d has a curved surface 30c1, unlike a frame 30d illustrated in FIG. 15. More specifically, the radius of curvature of a reflective surface that guides light from the light emitting devices 30a to the optical surface S24 varies in accordance with a position. This enables the luminance distribution on the optical surface S24 to have a desired state.

It is noted that the light emitting devices 30a may be replaced with a single light emitting device 30a or a planar light source. Alternatively, a plurality of light emitting devices may be used so as to be arranged as illustrated in FIGS. 4A to 4D to vary the luminance on the optical surface S24.

FIGS. 4A to 4D are front views of the light emitting devices. As illustrated in the drawings, irregular spaces between the plurality of light emitting devices 30a and/or uneven arrangement thereof can vary the luminance on the optical surface S24.

This enables the luminance in an area (30b1) where a pencil of rays are dense to be high and the luminance in an area (30b2) where a pencil of rays are thin to be low on the optical surface S24, and therefore, a comfortable image with significantly reduced luminance non-uniformity can be viewed at the exit pupil S1.

Referring to FIG. 2, for the area 30b1 on the optical surface S24, rays exit in inclined directions with respect to the direction of the normal to the optical surface S24.

Figure 5:
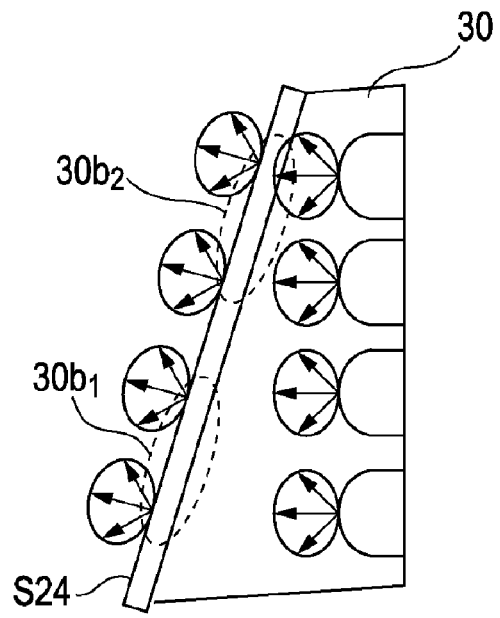
FIG. 5 illustrates a portion of the optical system shown in FIG. 1 according to another variation.

Therefore, the light source unit 30 may have a structure illustrated in FIG. 5 that increases the luminance in the area 30b1.

Figure 16:
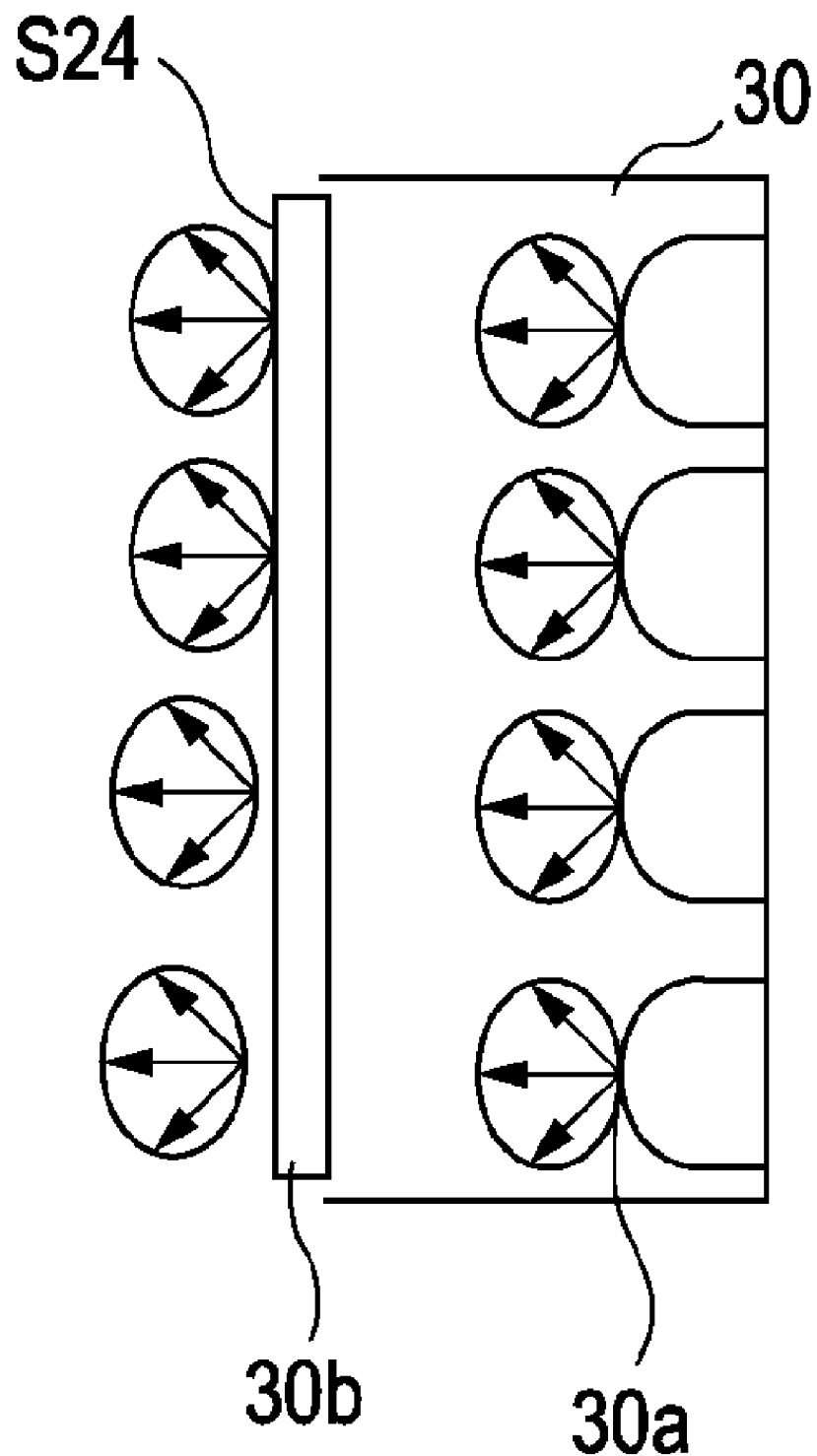
FIG. 16 is an illustration used for comparison with the illumination unit according to an embodiment of the present invention.

For the light source unit 30 illustrated in FIG. 16, a pencil of rays exiting from the optical surface S24 has uniform diffusion directivity. In contrast to this, according to the present embodiment, as illustrated in FIG. 5, since the distance between the light emitting device 30a and the optical surface S24 varies in accordance with a position on the optical surface S24, rays can exit from the optical surface S24 so as to have diffusion directivity that enables rays exiting from the area 30b1 to efficiently reach the exit pupil.

Figure 6:
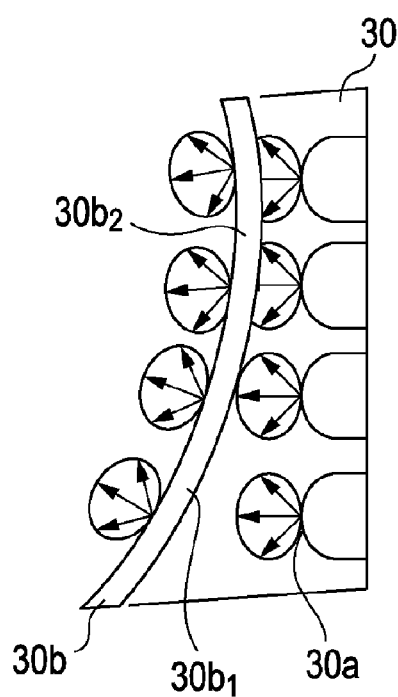
FIG. 6 illustrates a portion of the optical system shown in FIG. 1 according to another variation.

Alternatively, the light source unit 30 may have a structure illustrated in FIG. 6, in which the diffuser 30b is curved so as to enable rays exiting from the area 30b2 to efficiently reach the exit pupil S1 in the optical system.

Therefore, all a pencil of rays exiting from the light source unit 30 can reach the pupil S1 of a viewer. As a result, even with the same light emitting devices, a bright image with reduced luminance non-uniformity can be displayed.

If an image to be viewed has the same brightness, the number of light emitting devices can be reduced. Moreover, because a current of a light source can be reduced to a low value since the light emitting devices emit light, heat generated by the apparatus can be suppressed. This leads to an advantage of reducing the workload for a special unit for dissipating heat and thus reducing the weight of the apparatus.

An element that has a periodic structure that regulates an angular aperture, such as a prism sheet, a Fresnel lens, or a hologram sheet, may be disposed between the light emitting devices 30a and the optical surface S24. This enables a pencil of rays whose diffusion directivity is regulated to exit from the optical surface S24. The same applies to the second to fourth embodiments, which will be described below.

The light source unit is not limited to the structure described above. The shape of the light source unit can be varied in accordance with the density of rays on the optical surface or the diffusion directivity in reverse ray tracing of the display optical system and the illumination optical system.

Second Exemplary Embodiment

Figure 7:
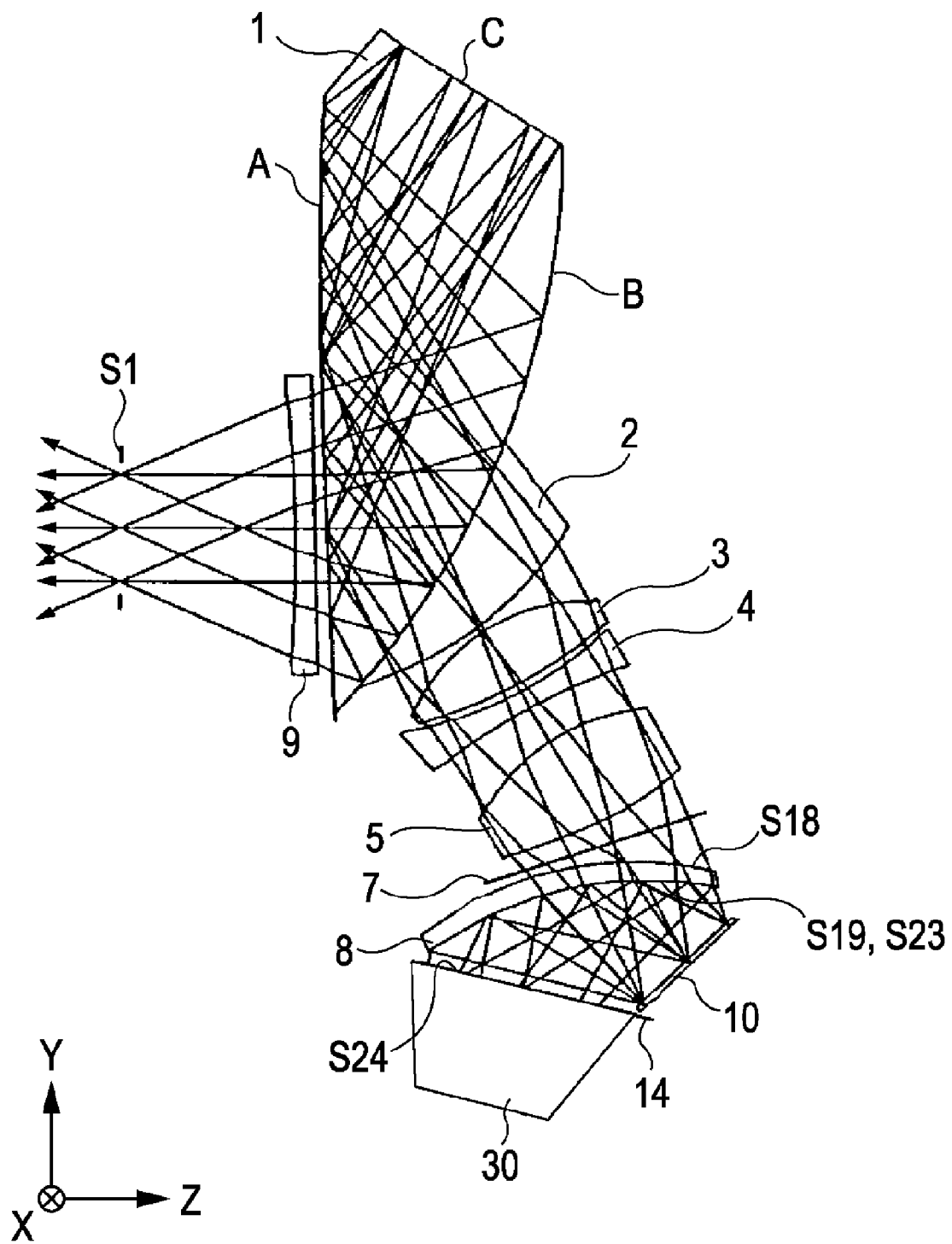
FIG. 7 is an illustration of an example optical system in an image display apparatus according to a second embodiment of the present invention.

FIG. 7 is a schematic diagram that illustrates a main portion of a head-mounted display being an image display apparatus according to a second embodiment of the present invention. Optical data for the second embodiment will be shown in a second numerical example below. In FIG. 7, components having the same reference numerals as in FIG. 1 have similar functions and operations. Thus, repetitive description of the same is omitted.

Differences between the second embodiment and the first embodiment include an optical element 9 having a negative refractive power is provided between the exit pupil S1 and the optical element 1; the lens element 3 and the lens element 4 are not joined together but are separated; and the position of the light source unit 30 with respect to the LCD 10 is changed.

The unit of numerical values having dimensions in the second numerical example, which will be described below, is in millimeters. According to the present embodiment, the display optical system can display an image having a size of approximately 18 mm×14 mm with a horizontal angle of view of 60° at infinity in the z-axis. To enable any viewer to view an image with a horizontal angle of view of 60°, the diameter of a pupil is 14 mm.

Figure 8:
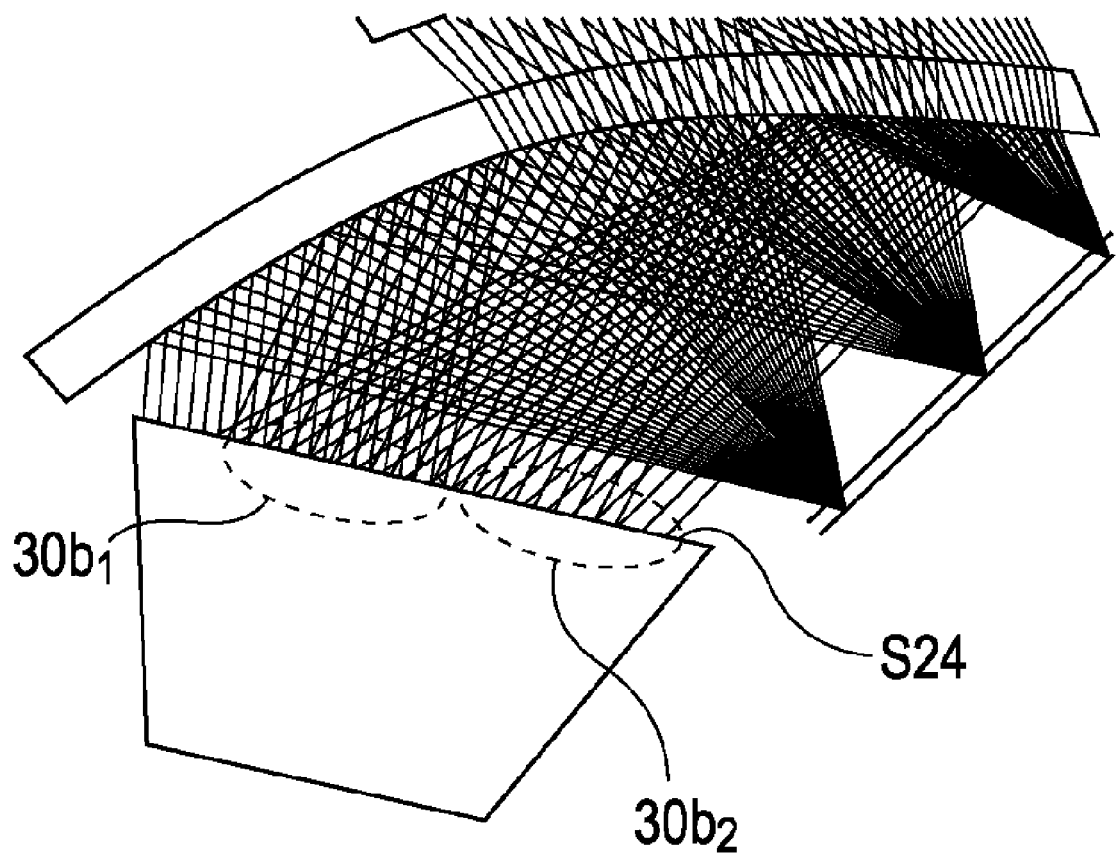
FIG. 8 illustrates a portion of the optical system shown in FIG. 7.

FIG. 8 illustrates how rays exit from the optical surface S24 of the light source unit 30 when reverse ray tracing is performed on the second embodiment. In particular, the number of rays is large, i.e., the density of a pencil of rays is high in the area 30b1. Therefore, the luminance on the optical surface S24 of the light source unit 30 is varied by optimizing the shape of the light source unit 30 and arrangement of the light emitting devices 30a. More specifically, the luminance is high in the area 30b1 and is low in the other area 30b2. Therefore, a comfortable image with significantly reduced luminance non-uniformity as the entire display optical system can be viewed.

Still referring to FIG. 8, from the viewpoint of the optical surface S24, for all areas, rays exit in inclined directions with respect to the direction of the normal to the optical surface S24.

Therefore, the system has a structure in which the diffusion directivity of rays exiting from the optical surface S24 matches with the direction of incidence of rays on each position on the optical surface S24 in ray tracing from the exit pupil to the optical surface S24. This structure enables all rays exiting from the light source unit 30 to reach the pupil S1 of a viewer. As a result, even when the same light emitting devices are used, the viewer can view a bright image with reduced luminance non-uniformity.

Third Exemplary Embodiment

Figure 9:
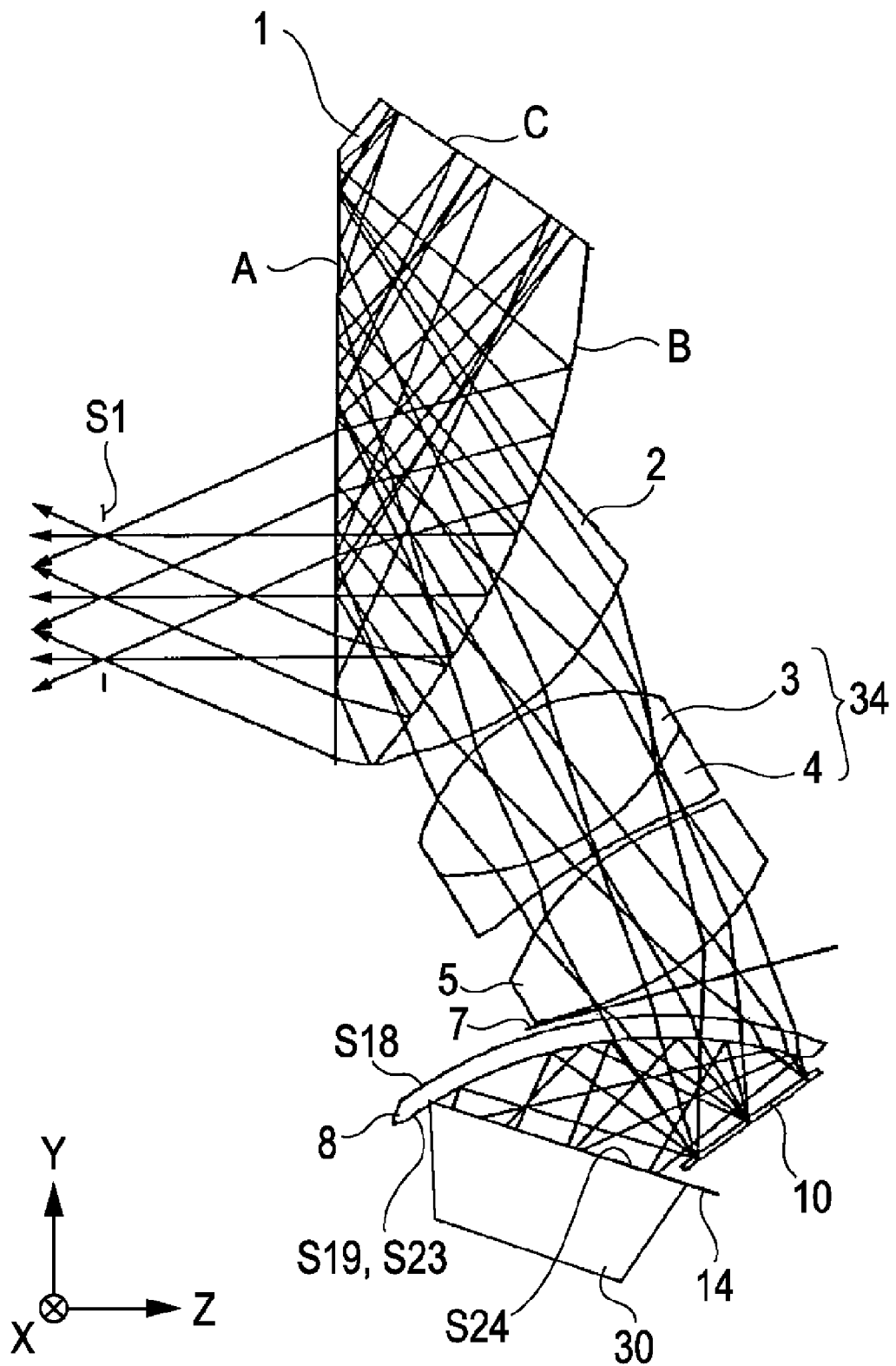
FIG. 9 is an illustration of an example optical system in an image display apparatus according to a third embodiment of the present invention.

FIG. 9 is a schematic diagram that illustrates a main portion of a head-mounted display being an image display apparatus according to a third embodiment of the present invention. Optical data for the third embodiment will be shown in a third numerical example below. In FIG. 9, components having the same reference numerals as in FIG. 1 have similar functions and operations. Therefore detailed description of the same is omitted.

Differences between the third embodiment and the first embodiment include the planar element 6 be omitted; and also the position of the light source unit 30 with respect to the LCD 10 is changed.

The unit of numerical values having dimensions in the third numerical example, which will be described below, is in millimeters. According to the present embodiment, the display optical system can display an image having a size of approximately 18 mm×14 mm with a horizontal angle of view of 60° at infinity in the z-axis. To enable any viewer to view an image with a horizontal angle of view of 60°, the diameter of a pupil is 14 mm.

Figure 10:
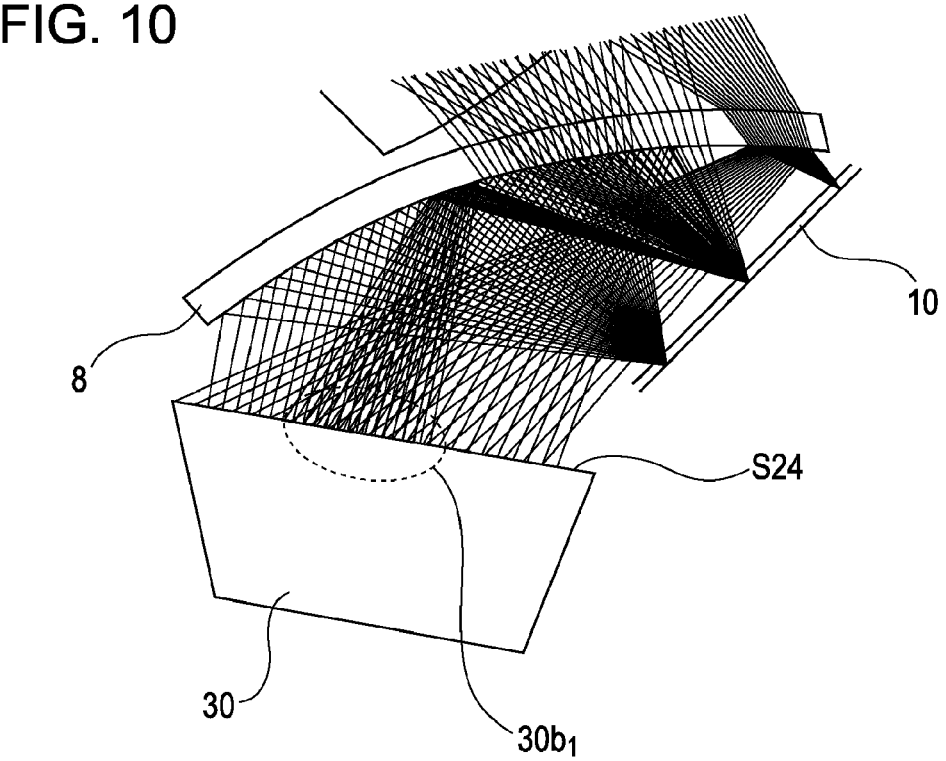
FIG. 10 illustrates a portion of the optical system shown in FIG. 9.

FIG. 10 illustrates how reversely traced rays exit from the optical surface S24 of the light source unit 30 when reverse ray tracing is performed on the third embodiment.

In particular, the number of rays is large, i.e., the density of a pencil of rays is high in the area 30b1. Therefore, the luminance on the optical surface S24 of the light source unit 30 is varied by optimizing the shape of the light source unit 30 and arrangement of the light emitting devices 30a such that the luminance is high in the area 30b1 and is low in the other areas. Therefore, a comfortable image with significantly reduced luminance non-uniformity can be viewed.

Still referring to FIG. 10, from the viewpoint of the optical surface S24, for all areas, rays exit in inclined directions with respect to the direction of the normal to the optical surface S24. Therefore, the system has a structure in which light from the light emitting devices exists from the optical surface S24 with diffusion directivity matching with diffusion directivity of rays determined by the reverse ray tracing.

This structure enables all rays exiting from the light source unit 30 to reach the pupil S1 of a viewer. As a result, even when the same light emitting devices are used, the viewer can view a bright image with reduced luminance non-uniformity.

Figure 11:
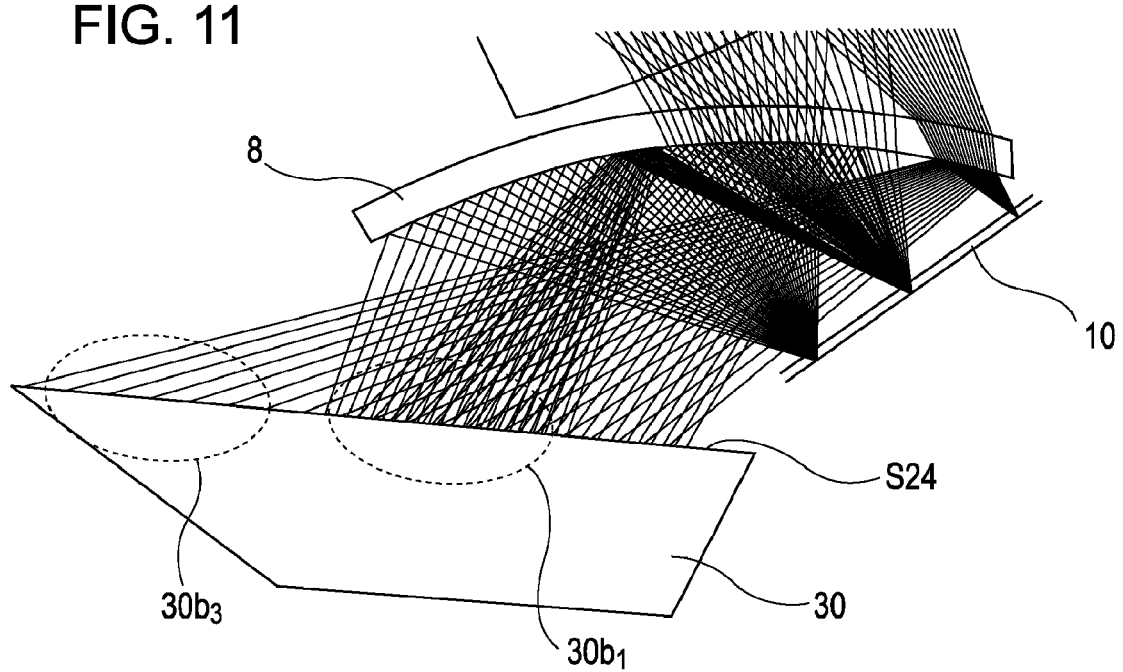
FIG. 11 illustrates a portion of the optical system shown in FIG. 9 according to a variation.

Even in the same display optical system, if the light source unit 30 is disposed as illustrated in FIG. 11, when reverse ray tracing is performed, the density distribution of rays on the optical surface S24 of the light source unit 30 is different from FIG. 10. In FIG. 11, the density is higher in the area 30$b$1.

Diffusion directivity characteristics of rays are also very different. According to the third embodiment, the diffusion directivity characteristics in an area 30$b$3 are significantly different from FIG. 10. Therefore, the light source unit having a different structure from that in FIG. 10 that enables all a pencil of rays exiting from the light source unit 30 to reach the exit pupil S1 of a viewer allows a viewer to view a comfortable image with reduced luminance non-uniformity.

Since all a pencil of rays exiting from the light source unit 30 can reach the pupil S1 of a viewer, even when the same light emitting devices are used, a bright image with reduced luminance non-uniformity can be displayed.

Fourth Exemplary Embodiment

Figure 12:
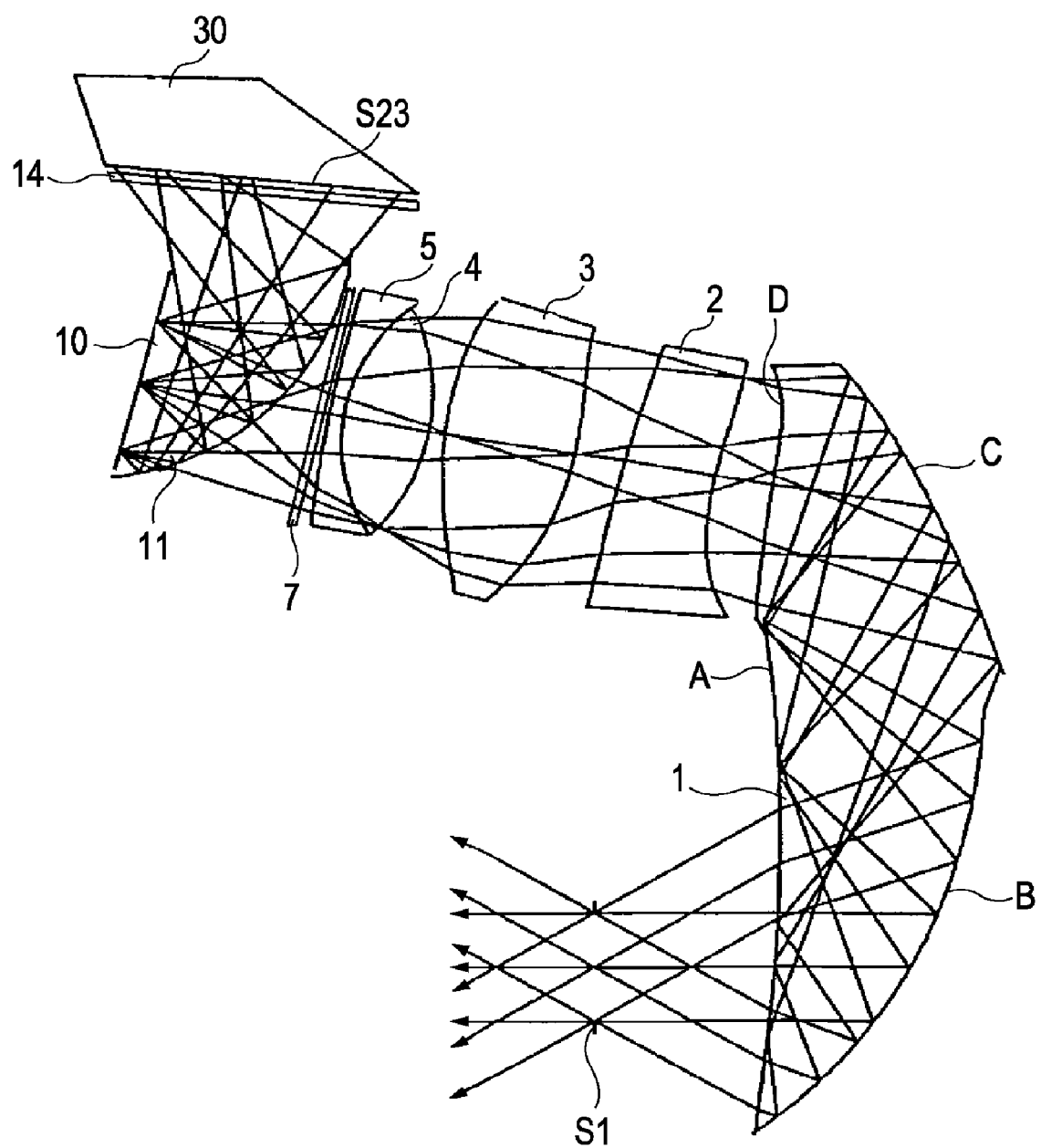
FIG. 12 is an illustration of an example optical system in an image display apparatus according to a fourth embodiment of the present invention.

FIG. 12 is a schematic diagram that illustrates a main portion of a head-mounted display being an image display apparatus according to a fourth embodiment of the present invention. Optical data for the fourth embodiment will be shown in a fourth numerical example below.

In FIG. 12, the optical element 1 is a prism that includes a transparent medium with four optical surfaces A, B, C, and D. The transparent medium has a material refractive index of greater than one. Each of the optical elements 2 and 3 is a prism that includes a transparent medium with two optical surfaces. The transparent medium has a material refractive index of greater than one.

Each of the lens elements (optical elements) 4 and 5 has two surfaces. The lens elements 4 and 5 are attached together. The apparatus also includes a half-mirror surface 11. The LCD 10 is configured to display an image.

According to the present embodiment, each of all surfaces forming the optical elements 1, 2, and 3 is symmetrical with respect to only the surface of the drawing (y-z plane).

Next, how light emitted from the light source unit 30 travels will now be described. Light emitted from the light source unit 30 is linearly polarized when passing through the polarizer 14. The light is then reflected by the half-mirror surface 11 and is directed toward the reflective LCD 10. The light obliquely incident on the LCD 10 and then obliquely reflected by the LCD 10 passes through the half-mirror surface 11 and the polarizer 7 and is directed toward the optical element 5.

The light incident on the optical element 5 passes through the optical elements 4, 3, and 2 in sequence. The light is then incident on the optical element 1 from the surface D. The light incident on the optical element 1 is reflected by the surface C, then reflected by the surface A, and then reflected by the surface B. The light exists from the optical element 1 through the surface A toward the exit pupil S1.

The unit of numerical values having dimensions in the first numerical example, which will be described below, is in millimeters. According to the first embodiment, the display optical system can display an image having a size of approximately 18 mm×14 mm with a horizontal angle of view of 60° at infinity in the z-axis.

Figure 13:
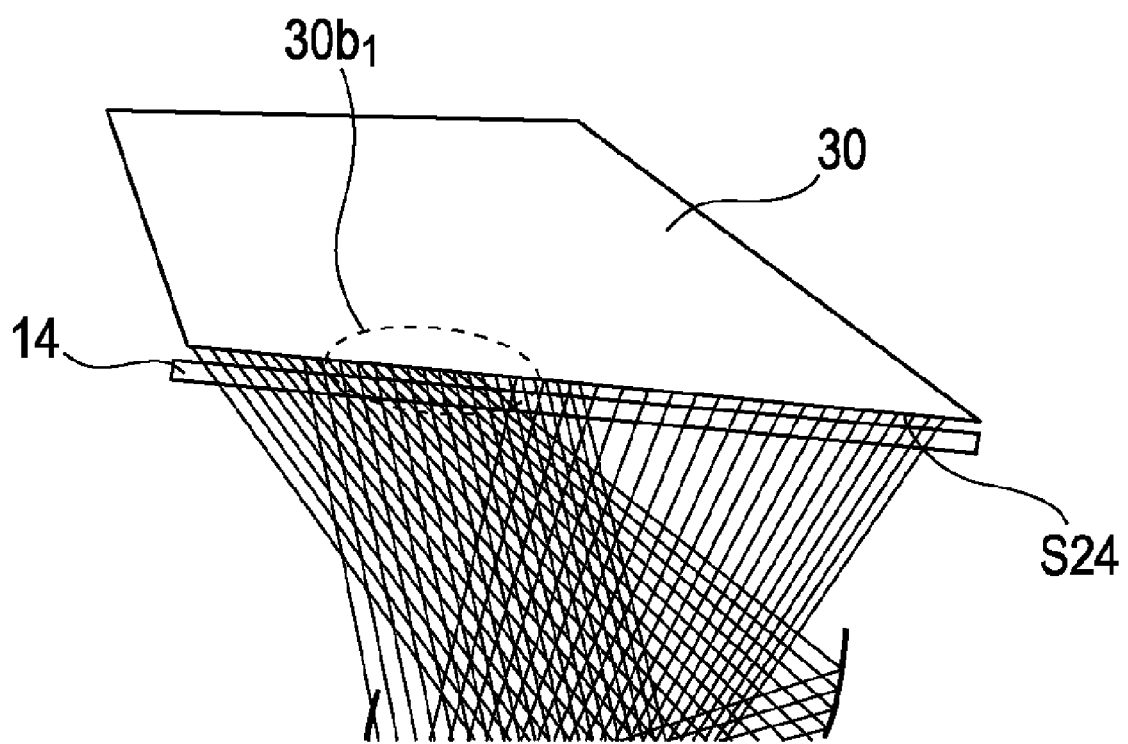
FIG. 13 illustrates a portion of the optical system shown in FIG. 12.

To enable any viewer to view an image with a horizontal angle of view of 60°, the diameter of a pupil is 14 mm. FIG. 13 illustrates how reversely traced rays exit from the optical surface S24 of the light source unit 30 when reverse ray tracing is performed on the fourth embodiment. In particular, the number of rays is large, i.e., the density of a pencil of rays is high in the area 30$b$1. Therefore, the luminance on the optical surface S24 of the light source unit 30 is varied by optimizing the shape of the light source unit 30 and arrangement of the light emitting devices 30$a$ such that the luminance is high in the area 30$b$1 and is low in the other areas.

Therefore, a comfortable image with significantly reduced luminance non-uniformity can be viewed. Referring to FIG. 13, from the viewpoint of the optical surface S24, for all areas, rays exit in inclined directions with respect to the direction of the normal to the optical surface S24.

Therefore, the system has a structure in which light from the light emitting devices exists from the optical surface S24 with diffusion directivity matching with diffusion directivity of rays determined by the reverse ray tracing.

Therefore, all a pencil of rays exiting from the light source unit 30 can reach the pupil S1 of a viewer. As a result, even when the same light emitting devices are used, a bright image with reduced luminance non-uniformity can be displayed.

Numerical Examples for the Exemplary Embodiments

The numerical examples for the first to fourth embodiments are described below in Tables I through IV.

TABLE I

[First Numerical Example]

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 9.365 | 21.886 | −0.529 | −284.2114 | FFS1 | 1.5300 | 55.8 |
| 3 | 0.000 | −2.638 | 34.455 | −31.052 | −72.0536 | FFS2 | −1.5300 | 55.8 |
| 4 | 0.000 | 9.365 | 21.886 | −0.529 | −284.2114 | FFS1 | 1.5300 | 55.8 |
| 5 | 0.000 | 30.738 | 47.306 | 48.060 | −189.3367 | FFS3 | −1.5300 | 55.8 |
| 6 | 0.000 | 9.365 | 21.886 | −0.529 | −284.2114 | FFS1 | 1.5300 | 55.8 |
| 7 | 0.000 | −2.638 | 34.455 | −31.052 | −72.0536 | FFS2 | 1.5300 | 55.8 |
| 8 | 0.000 | −2.638 | 34.455 | −31.052 | −72.0536 | FFS2 | 1.5300 | 55.8 |
| 9 | 0.000 | −5.791 | 39.117 | −46.389 | −56.9404 | FFS4 | 1.0000 | |
| 10 | 0.000 | −7.538 | 37.525 | −53.721 | 18.2091 | SPH | 1.4875 | 70.2 |
| 11 | 0.000 | −16.105 | 43.813 | −53.721 | −21.5267 | SPH | 1.7618 | 26.5 |

TABLE I-continued

[First Numerical Example]

| | | | | | | | | |
|---|---|---|---|---|---|---|---|---|
| 12 | 0.000 | −17.556 | 44.878 | −53.721 | 66.0282 | SPH | 1.0000 | |
| 13 | 0.000 | −18.692 | 44.573 | −50.460 | 20.6510 | FFS5 | 1.5300 | 55.8 |
| 14 | 0.000 | −32.859 | 25.439 | −88.990 | −118.4382 | FFS6 | 1.0000 | |
| 15 | 0.000 | −49.433 | 29.812 | −45.448 | ∞ | SPH | 1.5230 | 58.6 |
| 16 | 0.000 | −50.288 | 30.654 | −45.448 | ∞ | SPH | 1.0000 | |
| 17 | 0.000 | −32.898 | 51.561 | −24.427 | 25.6080 | CYL | 1.7618 | 26.5 |
| 18 | 0.000 | −30.463 | 55.740 | −38.300 | 21.8260 | CYL | 1.0000 | |
| 19 | 0.000 | −38.215 | 64.167 | −66.742 | ∞ | SPH | 1.5500 | 52.0 |
| 20 | 0.000 | −38.858 | 64.443 | −66.742 | ∞ | SPH | 1.0000 | |
| 21 | 0.000 | −38.858 | 64.443 | −66.742 | 0.0000 | SPH | 1.0000 | 0.0 |

FFS1
| $c_1$: | 4.7708e+001 | $c_5$: | −2.2635e−003 | $c_6$: | −2.6964e−004 | $c_{10}$: | −3.5045e−006 |
|---|---|---|---|---|---|---|---|
| $c_{11}$: | −1.8961e−005 | $c_{12}$: | −2.5872e−007 | $c_{13}$: | −3.5080e−007 | $c_{14}$: | −1.8809e−007 |
| $c_{20}$: | −8.5708e−010 | $c_{21}$: | −5.5035e−010 | $c_{22}$: | −4.8677e−010 | $c_{23}$: | 1.7886e−011 |
| $c_{24}$: | 2.5426e−011 | $c_{25}$: | 1.2297e−011 | $c_{26}$: | 6.2276e−012 | | |

FFS2
| $c_1$: | −8.0283e−001 | $c_5$: | −1.3225e−003 | $c_6$: | −3.2740e−004 | $c_{10}$: | −1.0438e−005 |
|---|---|---|---|---|---|---|---|
| $c_{11}$: | −4.7937e−007 | $c_{12}$: | −5.0068e−008 | $c_{13}$: | −6.2302e−008 | $c_{14}$: | 4.5234e−008 |
| $c_{20}$: | 1.9842e−009 | $c_{21}$: | −5.0837e−010 | $c_{22}$: | 1.1409e−009 | $c_{23}$: | 1.8477e−011 |
| $c_{24}$: | −1.7819e−011 | $c_{25}$: | 1.2831e−011 | $c_{26}$: | −2.0655e−011 | | |

FFS3
| $c_1$: | 2.6924e+001 | $c_5$: | 2.4531e−004 | $c_6$: | −1.2389e−003 | $c_{10}$: | −4.7294e−005 |
|---|---|---|---|---|---|---|---|
| $c_{11}$: | 3.6501e−005 | $c_{12}$: | 2.1833e−006 | $c_{13}$: | −2.0621e−006 | $c_{14}$: | 1.3400e−006 |
| $c_{20}$: | −3.4331e−008 | $c_{21}$: | 2.1762e−008 | $c_{22}$: | −5.5534e−009 | $c_{23}$: | −2.7291e−010 |
| $c_{24}$: | −2.2240e−010 | $c_{25}$: | −2.8204e−010 | $c_{26}$: | 2.0643e−011 | | |

FFS4
| $c_1$: | −2.0112e+000 | $c_5$: | −1.1439e−003 | $c_6$: | −7.0182e−003 | $c_{10}$: | 6.6323e−005 |
|---|---|---|---|---|---|---|---|
| $c_{11}$: | 3.7827e−005 | $c_{12}$: | −3.0764e−007 | $c_{13}$: | −1.2255e−007 | $c_{14}$: | 2.8074e−007 |
| $c_{20}$: | −4.8304e−008 | $c_{21}$: | −6.8627e−009 | $c_{22}$: | 1.4540e−008 | $c_{23}$: | 1.9275e−010 |
| $c_{24}$: | −2.0887e−010 | $c_{25}$: | −6.5050e−010 | $c_{26}$: | 1.3565e−010 | | |

FFS5
| $c_1$: | 8.3170e−001 | $c_5$: | 2.2565e−003 | $c_6$: | −1.7932e−003 | $c_{10}$: | 4.9769e−005 |
|---|---|---|---|---|---|---|---|
| $c_{11}$: | 5.8833e−005 | $c_{12}$: | −1.8053e−006 | $c_{13}$: | 3.0888e−007 | $c_{14}$: | −2.4892e−006 |
| $c_{20}$: | −1.1149e−008 | $c_{21}$: | −5.0541e−008 | $c_{22}$: | 3.6852e−008 | $c_{23}$: | 1.3332e−009 |
| $c_{24}$ | −1.1902e−009 | $c_{25}$: | −7.4560e−011 | $c_{26}$: | −9.7807e−009 | | |

FFS6
| $c_1$: | 5.0873e−001 | $c_5$: | 1.7979e−003 | $c_6$: | 1.0845e−003 | $c_{10}$: | −4.0100e−005 |
|---|---|---|---|---|---|---|---|
| $c_{11}$: | −2.0713e−004 | $c_{12}$: | 3.9779e−006 | $c_{13}$: | 1.4457e−006 | $c_{14}$: | −2.9702e−007 |
| $c_{20}$: | −5.7229e−009 | $c_{21}$: | 2.9933e−008 | $c_{22}$: | −3.2629e−008 | $c_{23}$: | −5.6700e−011 |
| $c_{24}$: | −1.7802e−010 | $c_{25}$: | −2.0885e−010 | $c_{26}$: | −3.8998e−011 | | |

TABLE II

[Second Numerical Example]

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 0.354 | 18.405 | 1.469 | −136.7211 | SPH | 1.7618 | 26.5 |
| 3 | 0.000 | 0.406 | 20.404 | 1.469 | ∞ | SPH | 1.0000 | |
| 4 | 0.000 | 9.259 | 21.177 | 2.214 | −469.1111 | FFS1 | 1.5300 | 55.8 |
| 5 | 0.000 | 5.022 | 38.481 | −23.133 | −75.5610 | FFS2 | −1.5300 | 55.8 |
| 6 | 0.000 | 9.259 | 21.177 | 2.214 | −469.1111 | FFS1 | 1.5300 | 55.8 |
| 7 | 0.000 | 34.209 | 54.410 | 55.179 | −180.1511 | FFS3 | −1.5300 | 55.8 |
| 8 | 0.000 | 9.259 | 21.177 | 2.214 | −469.1111 | FFS1 | 1.5300 | 55.8 |
| 9 | 0.000 | 5.022 | 38.481 | −23.133 | −75.5610 | FFS2 | 1.5300 | 55.8 |
| 10 | 0.000 | 5.022 | 38.481 | −23.133 | −75.5610 | FFS2 | 1.5300 | 55.8 |
| 11 | 0.000 | 0.345 | 46.831 | −31.122 | −107.1944 | FFS4 | 1.0000 | |
| 12 | 0.000 | −9.458 | 40.330 | −64.394 | 19.9021 | SPH | 1.4875 | 70.2 |
| 13 | 0.000 | −15.667 | 42.631 | −60.135 | −51.7320 | SPH | 1.0000 | |
| 14 | 0.000 | −16.654 | 42.682 | −60.413 | −40.0596 | SPH | 1.7618 | 26.5 |
| 15 | 0.000 | −17.814 | 44.691 | −63.011 | 65.9693 | SPH | 1.0000 | |
| 16 | 0.000 | −21.067 | 47.028 | −63.163 | 18.8246 | FFS5 | 1.5300 | 55.8 |
| 17 | 0.000 | −36.301 | 33.494 | −74.884 | −77.6795 | FFS6 | 1.0000 | |
| 18 | 0.000 | −34.770 | 53.842 | −89.719 | 36.9295 | CYL | 1.4875 | 70.4 |
| 19 | 0.000 | −36.670 | 53.819 | −87.760 | 38.5518 | CYL | 1.0000 | |
| 20 | 0.000 | −49.906 | 54.337 | −46.389 | ∞ | SPH | 1.5500 | 52.0 |
| 21 | 0.000 | −50.606 | 54.364 | −46.389 | ∞ | SPH | 1.0000 | |
| 22 | 0.000 | −50.606 | 54.364 | −46.389 | 0.0000 | SPH | 1.0000 | 0.0 |

FFS1
| $c_1$: | −3.5142e+000 | $c_5$: | −1.1224e−003 | $c_6$: | 3.0047e−004 | $c_{10}$: | 1.6178e−006 |
|---|---|---|---|---|---|---|---|
| $c_{11}$: | −2.3024e−006 | $c_{12}$: | −1.0174e−007 | $c_{13}$: | −1.3665e−007 | $c_{14}$: | −8.2428e−008 |
| $c_{20}$: | 6.4444e−011 | $c_{21}$: | −4.5295e−010 | $c_{22}$: | −3.8790e−010 | $c_{23}$: | 3.3132e−013 |

TABLE II-continued

[Second Numerical Example]

| | | | | | | | |
|---|---|---|---|---|---|---|---|
| c24: | 2.2972e−013 | c25: | 6.0295e−013 | c26: | 1.4337e−012 | | |
| FFS2 | | | | | | | |
| c1: | 1.2950e+000 | c5: | −1.4032e−003 | c6: | −2.7965e−004 | c10: | 7.0382e−006 |
| c11: | 5.5439e−007 | c12: | −1.7720e−008 | c13: | 5.3552e−009 | c14: | 1.8816e−007 |
| c20: | −8.0878e−010 | c21: | 5.5724e−010 | c22: | −5.6967e−010 | c23: | −3.8603e−013 |
| c24: | −1.7807e−011 | c25: | −1.8045e−012 | c26: | −9.2497e−012 | | |
| FFS3 | | | | | | | |
| c1: | −5.9895e+000 | c5: | −8.9010e−004 | c6: | −6.3693e−005 | c10: | 1.8175e−006 |
| c11: | 9.7146e−006 | c12: | 1.1339e−007 | c13: | 4.2958e−009 | c14: | 2.5671e−008 |
| c20: | 9.3576e−011 | c21: | −3.8979e−010 | c22: | 3.1680e−009 | c23: | −2.7038e−011 |
| c24: | 7.7717e−012 | c25: | −1.0598e−011 | c26: | 5.4081e−012 | | |
| FFS4 | | | | | | | |
| c1: | 3.2848e+000 | c5: | −1.3584e−003 | c6: | −3.6912e−003 | c10: | 6.8912e−005 |
| c11: | 4.0703e−005 | c12: | 6.8456e−007 | c13: | −3.2043e−006 | c14: | −3.3292e−007 |
| c20: | −3.8440e−009 | c21: | −2.6745e−009 | c22: | 1.3757e−009 | c23: | −1.6929e−010 |
| c24: | −2.3522e−010 | c25: | −1.0763e−010 | c26: | −4.0575e−011 | | |
| FFS5 | | | | | | | |
| c1: | −5.3753e−001 | c5: | 1.5035e−003 | c6: | −1.7174e−004 | c10: | −1.5884e−005 |
| c11: | 1.3331e−004 | c12: | −2.1151e−006 | c13: | 9.6711e−007 | c14: | −1.4211e−006 |
| c20: | −6.6002e−008 | c21: | 3.6230e−008 | c22: | −1.6300e−008 | c23: | 1.1167e−010 |
| c24: | −1.1552e−009 | c25: | 5.5383e−010 | c26: | −2.7815e−009 | | |
| FFS6 | | | | | | | |
| c1: | 6.7826e−001 | c5: | −3.6616e−003 | c6: | 6.1230e−005 | c10: | −9.0367e−006 |
| c11: | −2.6342e−005 | c12: | 5.1808e−007 | c13: | 3.3044e−007 | c14: | −1.0194e−007 |
| c20: | −1.5907e−009 | c21: | 7.6035e−009 | c22: | 2.5169e−009 | c23: | 2.9829e−010 |
| c24: | −2.3108e−010 | c25: | 5.8907e−012 | c26: | 1.9299e−011 | | |

TABLE III

[Third Numerical Example]

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 10.841 | 21.436 | −0.604 | −352.9905 | FFS1 | 1.5300 | 55.8 |
| 3 | 0.000 | −2.791 | 33.876 | −30.275 | −75.8089 | FFS2 | −1.5300 | 55.8 |
| 4 | 0.000 | 10.841 | 21.436 | −0.604 | −352.9905 | FFS1 | 1.5300 | 55.8 |
| 5 | 0.000 | 33.879 | 41.433 | 53.462 | −197.0908 | FF | −1.5300 | 55.8 |
| 6 | 0.000 | 10.841 | 21.436 | −0.604 | −352.9905 | FF | 1.5300 | 55.8 |
| 7 | 0.000 | −2.791 | 33.876 | −30.275 | −75.8089 | FFS2 | 1.5300 | 55.8 |
| 8 | 0.000 | −2.791 | 33.876 | −30.275 | −75.8089 | FFS2 | 1.5300 | 55.8 |
| 9 | 0.000 | −7.196 | 41.839 | −43.971 | −63.4555 | FFS4 | 1.0000 | |
| 10 | 0.000 | −11.638 | 37.392 | −58.707 | 18.6660 | SPH | 1.4875 | 70.2 |
| 11 | 0.000 | −22.246 | 43.841 | −58.707 | −22.2689 | SPH | 1.7618 | 26.5 |
| 12 | 0.000 | −23.785 | 44.776 | −58.707 | 61.7075 | SPH | 1.0000 | |
| 13 | 0.000 | −25.783 | 43.765 | −48.028 | 21.0144 | FFS5 | 1.5300 | 55.8 |
| 14 | 0.000 | −41.494 | 26.775 | −81.743 | −92.5180 | FFS6 | 1.0000 | |
| 15 | 0.000 | −38.685 | 45.914 | −82.594 | 41.2870 | CYL | 1.4875 | 70.2 |
| 16 | 0.000 | −40.878 | 44.746 | −80.774 | 41.2870 | CYL | 1.0000 | |
| 17 | 0.000 | −55.794 | 47.169 | −54.561 | ∞ | SPH | 1.5500 | 52.0 |
| 18 | 0.000 | −56.485 | 47.281 | −54.561 | ∞ | SPH | 1.0000 | |
| 19 | 0.000 | −56.485 | 47.281 | −54.561 | 0.0000 | SPH | 1.0000 | 0.0 |

| | | | | | | | |
|---|---|---|---|---|---|---|---|
| FFS1 | | | | | | | |
| c1: | 7.2184e+001 | c5: | −1.6665e−003 | c6: | −7.2422e−005 | c10: | −4.6772e−006 |
| c11: | −1.2027e−005 | c12: | −2.5677e−007 | c13: | −4.8083e−007 | c14: | −2.5025e−007 |
| c20: | −2.3618e−010 | c21: | 6.1664e−011 | c22: | 3.8390e−010 | c23: | 4.3369e−011 |
| c24: | 6.6350e−011 | c25: | 8.8166e−011 | c26: | 4.8625e−011 | | |
| FFS2 | | | | | | | |
| c1: | −2.6318e−001 | c5: | −1.1855e−003 | c6: | −3.6956e−004 | c10: | −6.9695e−006 |
| c11: | −1.0001e−006 | c12: | −1.6620e−009 | c13: | −1.1802e−007 | c14: | 2.9418e−008 |
| c20: | 8.8307e−010 | c21: | 5.1973e−010 | c22: | −4.6161e−010 | c23: | 2.1291e−013 |
| c24: | −1.7111e−012 | c25: | 6.2447e−012 | c26: | −4.4093e−012 | | |
| FFS3 | | | | | | | |
| c1: | −6.6986e+001 | c5: | 1.0045e−004 | c6: | −1.1422e−003 | c10: | 7.4597e−006 |
| c11: | −2.2377e−005 | c12: | 1.7250e−006 | c13: | −1.5586e−006 | c14: | 9.6682e−007 |
| c20: | −4.4616e−008 | c21: | 3.7490e−008 | c22: | −2.3601e−008 | c23: | −3.7207e−010 |
| c24: | 9.9407e−011 | c25: | −3.6052e−010 | c26: | 7.2921e−011 | | |
| FFS4 | | | | | | | |
| c1: | −6.5653e+000 | c5: | −2.1549e−004 | c6: | −6.3543e−003 | c10: | 6.1509e−005 |
| c11: | 5.1806e−005 | c12: | −2.6789e−007 | c13: | 1.5006e−008 | c14: | −6.0216e−007 |
| c20: | −1.9440e−008 | c21: | −7.7214e−009 | c22: | 2.8584e−009 | c23: | 1.5916e−010 |
| c24: | 4.7203e−010 | c25: | −4.3913e−010 | c26: | −1.4201e−010 | | |
| FFS5 | | | | | | | |
| c1: | −2.2697e−001 | c5: | 5.5284e−004 | c6: | −8.9698e−005 | c10: | −3.5449e−005 |

TABLE III-continued

[Third Numerical Example]

| | | | | | | | |
|---|---|---|---|---|---|---|---|
| c11: | 7.2729e−005 | c12: | −2.1230e−006 | c13: | 1.4771e−006 | c14: | −2.5204e−006 |
| c20: | 2.2693e−008 | c21: | −5.3195e−008 | c22: | −2.1732e−009 | c23: | 4.1626e−010 |
| c24: | −5.0053e−010 | c25: | 1.1931e−009 | c26: | −2.8094e−009 | | |
| FFS6 | | | | | | | |
| c1: | −2.5783e+001 | c5: | 1.9452e−003 | c6: | 1.2450e−003 | c10: | −2.5389e−005 |
| c11: | −1.6737e−004 | c12: | 4.7165e−006 | c13: | 1.5333e−006 | c14: | −9.3819e−008 |
| c20: | −3.2552e−009 | c21: | 3.1982e−008 | c22: | 1.3708e−008 | c23: | 3.2537e−010 |
| c24: | −2.7285e−010 | c25: | −1.2959e−010 | c26: | 3.0139e−011 | | |

TABLE IV

[Fourth Numerical Example]

| SURF | X | Y | Z | A | R | typ | Nd | vd |
|---|---|---|---|---|---|---|---|---|
| 1 | 0.000 | 0.000 | 0.000 | 0.000 | 0.0000 | SPH | 1.0000 | 0.0 |
| 2 | 0.000 | 6.001 | 22.661 | −3.015 | −244.6358 | FFS1 | 1.5300 | 55.8 |
| 3 | 0.000 | −5.783 | 35.586 | −34.841 | −63.4009 | FFS2 | −1.5300 | 55.8 |
| 4 | 0.000 | 6.001 | 22.661 | −3.015 | −244.6358 | FFS1 | 1.5300 | 55.8 |
| 5 | 0.000 | 33.742 | 51.816 | 16.395 | −134.9399 | FFS3 | −1.5300 | 55.8 |
| 6 | 0.000 | 52.536 | 20.599 | −6.691 | 59.4225 | FFS4 | −1.0000 | |
| 7 | 0.000 | 61.922 | 14.511 | −11.271 | 62.2478 | FFS5 | −1.5709 | 33.8 |
| 8 | 0.000 | 60.404 | 2.242 | −14.204 | 143.5896 | FFS6 | −1.0000 | |
| 9 | 0.000 | 64.966 | −2.985 | −14.247 | −37.9321 | FFS7 | −1.5300 | 55.8 |
| 10 | 0.000 | 72.989 | −18.039 | −11.670 | 54.1602 | FFS8 | −1.0000 | |
| 11 | 0.000 | 69.302 | −20.684 | −11.670 | −25.7628 | SPH | −1.6125 | 60.7 |
| 12 | 0.000 | 72.478 | −31.079 | −11.670 | 22.2050 | SPH | −1.7552 | 27.6 |
| 13 | 0.000 | 72.838 | −32.824 | −11.670 | 183.0353 | SPH | −1.0000 | |
| 15 | 0.000 | 73.229 | −39.800 | −45.137 | −33.0000 | SPH | −1.0000 | |
| 16 | 0.000 | 77.668 | −56.210 | −15.137 | ∞ | SPH | 1.0000 | |

FFS1
| | | | | | | | |
|---|---|---|---|---|---|---|---|
| c1: | 2.5709e+001 | c5: | −2.2951e−003 | c6: | −1.2671e−003 | c10: | −9.0272e−006 |
| c11: | −2.6018e−005 | c12: | 2.6016e−007 | c13: | −1.8366e−007 | c14: | −1.1967e−007 |
| c20: | −1.5225e−009 | c21: | 1.5850e−010 | c22: | 3.4085e−009 | c23: | 2.9938e−012 |
| c24: | −2.2093e−011 | c25: | −1.6024e−011 | c26: | 8.0489e−012 | | |

FFS2
| | | | | | | | |
|---|---|---|---|---|---|---|---|
| c1: | −2.7121e−001 | c5: | −1.1914e−003 | c6: | −5.1007e−004 | c10: | 3.3657e−006 |
| c11: | −2.4642e−006 | c12: | −3.2679e−008 | c13: | −2.4434e−008 | c14: | −3.3506e−008 |
| c20: | 6.6519e−010 | c21: | −4.4056e−010 | c22: | 4.4458e−010 | c23: | 4.3419e−012 |
| c24: | −3.1794e−012 | c25: | −5.4346e−013 | c26: | −3.8402e−012 | | |

FFS3
| | | | | | | | |
|---|---|---|---|---|---|---|---|
| c1: | 6.0381e−001 | c5: | −1.0115e−004 | c6: | 2.0574e−004 | c10: | 2.3999e−007 |
| c11: | −7.8454e−006 | c12: | 2.5931e−008 | c13: | 2.0375e−009 | c14: | 1.9470e−009 |
| c20: | −2.2269e−012 | c21: | 1.5218e−010 | c22: | −9.4066e−010 | c23: | −2.6234e−011 |
| c24: | −3.0703e−012 | c25: | 3.0102e−012 | c26: | −8.9320e−013 | | |

FFS4
| | | | | | | | |
|---|---|---|---|---|---|---|---|
| c1: | −2.7539e+000 | c5: | 7.1799e−004 | c6: | −2.6347e−003 | c10: | 5.5003e−006 |
| c11: | −1.7782e−006 | c12: | −1.3269e−007 | c13: | −5.0486e−007 | c14: | −2.0578e−007 |
| c20: | −4.5659e−009 | c21: | −1.2435e−008 | c22: | −1.5262e−008 | c23: | 6.1551e−010 |
| c24: | −1.2093e−010 | c25: | 4.7333e−010 | c26: | −2.1595e−010 | | |

FFS5
| | | | | | | | |
|---|---|---|---|---|---|---|---|
| c1: | 7.2268e−001 | c5: | 9.7360e−004 | c6: | 1.4458e−003 | c10: | −8.9127e−005 |
| c11: | 4.1840e−005 | c12: | −2.3570e−006 | c13: | −1.1168e−006 | c14: | 6.5803e−007 |
| c20: | −6.8198e−008 | c21: | −5.3553e−009 | c22: | −1.1075e−007 | c23: | 8.3682e−010 |
| c24: | 4.3730e−010 | c25: | 4.8670e−010 | c26: | 3.9744e−010 | | |

FFS6
| | | | | | | | |
|---|---|---|---|---|---|---|---|
| c1: | −1.1040e+001 | c5: | −3.7530e−004 | c6: | −5.7247e−004 | c10: | 3.5336e−006 |
| c11: | −3.4104e−005 | c12: | −1.0482e−007 | c13: | 5.3276e−007 | c14: | −2.8062e−007 |
| c20: | 8.5614e−009 | c21: | 2.1113e−011 | c22: | −3.9668e−008 | c23: | −2.9025e−010 |
| c24: | 3.9761e−010 | c25: | −1.7519e−011 | c26: | −4.7418e−011 | | |

FFS7
| | | | | | | | |
|---|---|---|---|---|---|---|---|
| c1: | 1.7736e−001 | c5: | −2.0250e−003 | c6: | 1.0966e−004 | c10: | 4.7470e−005 |
| c11: | −3.9099e−005 | c12: | 9.8450e−008 | c13: | 2.2094e−007 | c14: | 2.9521e−007 |
| c20: | 2.6216e−008 | c21: | −2.3300e−009 | c22: | 1.8448e−008 | c23: | −6.4972e−010 |
| c24: | 2.4594e−010 | c25: | −5.1593e−010 | c26: | 1.8772e−010 | | |

FFS8
| | | | | | | | |
|---|---|---|---|---|---|---|---|
| c1: | −2.7775e+000 | c5: | −4.0966e−004 | c6: | 3.3381e−004 | c10: | −1.0575e−005 |
| c11: | −1.2205e−005 | c12: | 2.9793e−007 | c13: | −1.4652e−006 | c14: | 5.6747e−007 |
| c20: | 6.8063e−008 | c21: | −1.0022e−008 | c22: | 2.0087e−008 | c23: | −2.5509e−010 |
| c24: | 1.3135e−010 | c25: | −1.5838e−010 | c26: | 5.5155e−010 | | |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-240063 filed Sep. 5, 2006, which is hereby incorporated by reference herein in its entirety.

What is claimed is:

1. An image display apparatus comprising:

an image display unit;

a light source unit including a light emitting device and an optical surface that receives light from the light emitting device;

an illumination optical system configured to guide light from the optical surface of the light source unit to the image display unit; and a display optical system configured to guide light from the image display unit to a viewer, wherein the light source unit is formed such that, when rays are traced from an exit pupil of the display optical system to the optical surface, luminance of the optical surface in an area where there are many rays incident on the optical surface is higher than luminance of the optical surface in an area where there are few rays incident on the optical surface; and wherein the light source unit includes a curved reflective surface that guides light from the light emitting device to the optical surface, the curved reflective surface having different radii of curvature according to a position thereon.

2. The image display apparatus according to claim 1, wherein the display optical system includes a rotationally asymmetric optical surface.

3. The image display apparatus according to claim 1, further comprising a surface functioning to transmit and reflect light and being concave with respect to the image display unit in a plane that contains a center ray corresponding to an angle of view, wherein the surface functioning to transmit and reflect light reflects light emerging from the light source unit and guides the light to the image display unit, and the surface functioning to transmit and reflect light transmits light reflected from the image display unit.

4. The image display apparatus according to claim 1, wherein the light emitting device and the optical surface are arranged so as not to be diametrically opposite each other.

* * * * *